United States Patent [19]

Yagi et al.

[11] 3,807,369
[45] Apr. 30, 1974

[54] COMBUSTION CHAMBER DEVICE OF AN INTERNAL COMBUSTION ENGINE OF THE TORCH IGNITION TYPE

[75] Inventors: Shizuo Yagi, Asaka; Tooru Hatanaka, Wako, both of Japan

[73] Assignee: Honda Giken Kogya Kabushiki Kaisha, Tokyo, Japan

[22] Filed: June 1, 1972

[21] Appl. No.: 258,519

[30] Foreign Application Priority Data
June 3, 1971 Japan.............................. 46-45733

[52] U.S. Cl. .......................... 123/32 ST, 123/32 SP
[51] Int. Cl. ...................... F02b 19/10, F02b 19/18
[58] Field of Search ........... 123/32 SP, 32 ST, 32 C, 123/32 L, 32 AA, 32 AH, 32 D

[56] References Cited
UNITED STATES PATENTS

| | | | |
|---|---|---|---|
| 1,271,942 | 7/1918 | Ricardo | 123/32 ST |
| 3,230,939 | 1/1966 | Goossak | 123/32 ST |
| 3,066,662 | 12/1962 | May | 123/32 ST |
| 2,884,913 | 5/1959 | Heintz | 123/32 ST |
| 2,126,442 | 8/1938 | Baud | 123/32 ST |

Primary Examiner—Laurence M. Goodridge
Assistant Examiner—Ronald B. Cox
Attorney, Agent, or Firm—Eric H. Waters

[57] ABSTRACT

The combustion chamber of an internal combustion engine of the torch ignition type is comprised of a main combustion chamber and a sub-combustion chamber in connection with the main combustion chamber through a connection hole, which has an igniter and a combustion cylinder being positioned at the center portion of the sub-combustion chamber to surround the ignition electrode of the igniter. And the combustion cylinder has a hole cut through the side wall to connect the space within the wall to the outer space thereof within the sub-combustion chamber.

2 Claims, 2 Drawing Figures

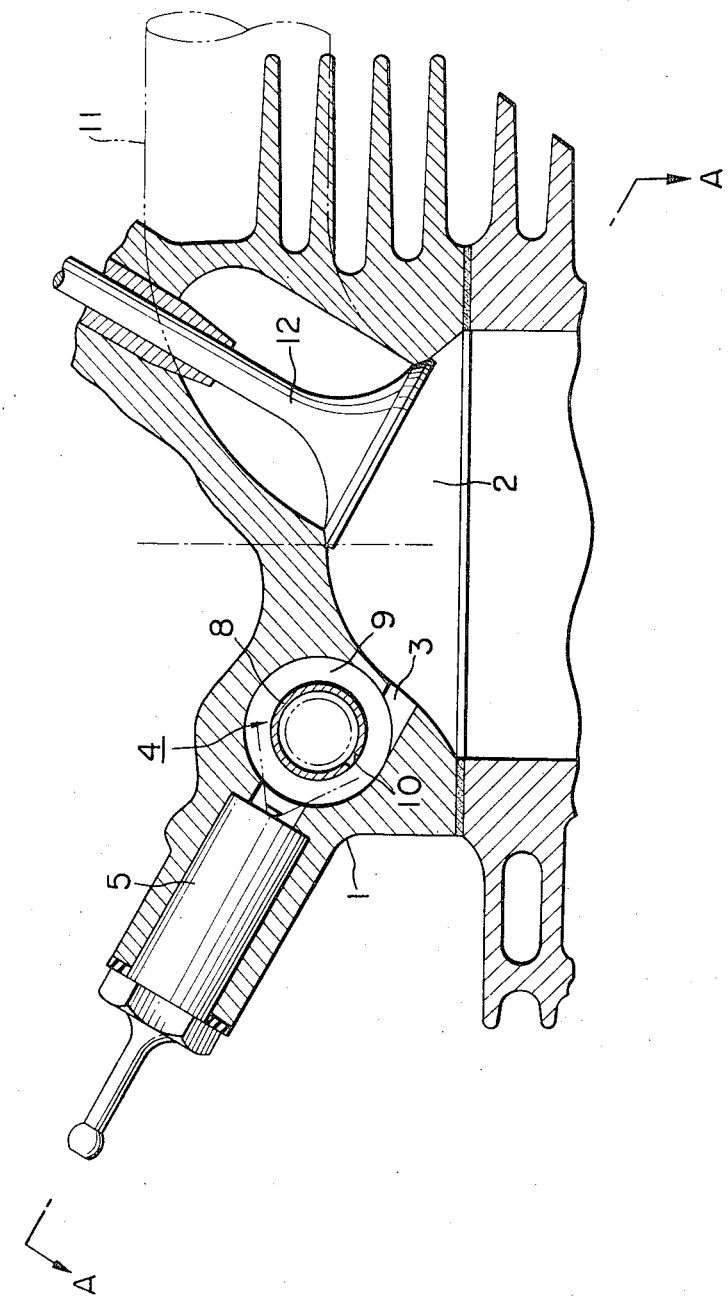

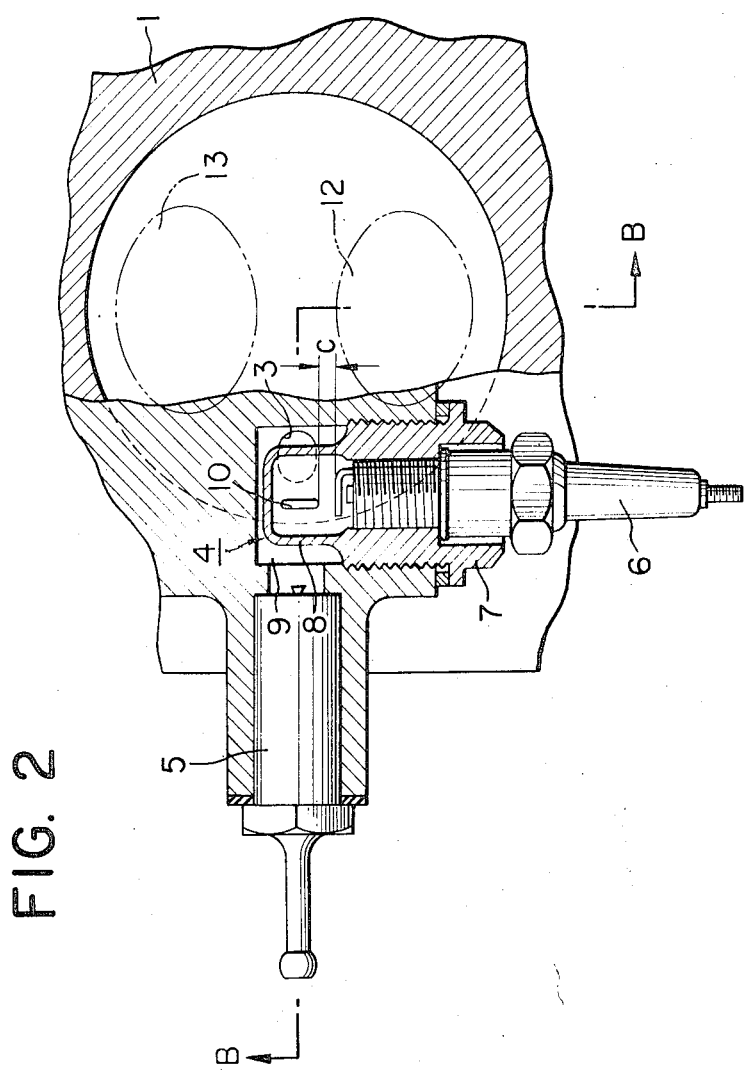

COMBUSTION CHAMBER DEVICE OF AN INTERNAL COMBUSTION ENGINE OF THE TORCH IGNITION TYPE

BRIEF SUMMARY OF THE INVENTION

The present invention relates to the combustion chamber device of an internal combustion engine of the torch ignition type which has a main combustion chamber and a sub-combustion chamber in connection with the main combustion chamber through a connection hole, whereby mixed gas of low air-fuel ratio in the main combustion chamber is ignited by flare generated in the sub-combustion chamber.

In prior art combustion chamber device, such as having a main combustion chamber and a sub-combustion chamber, misfire has often occurred and the igniter has easily been contaminated because the igniter has been wet with mixed gas of high air-fuel ratio in the sub-combustion chamber, and stable ignition could has not been expected because flare in the sub-combustion chamber has often been blown out by intake air from the main combustion chamber in compression stroke of the engine.

Therefore, main object of the present invention is to improve the prior art combustion chamber devices of the above mentioned type.

According to the present invention, the combustion chamber device of an internal combustion engine of the torch ignition type is comprised of a main combustion chamber and a sub-combustion chamber in connection with the main combustion chamber through a connection hole, and the sub-combustion chamber has a fuel injection nozzle, an igniter and a combustion cylinder which is positioned at the center portion of the sub-combustion chamber to surround the ignition electrode of the igniter. One or more holes are formed on the side wall of the combustion cylinder to connect the inner space of the cylinder to the outer space thereof within the sub-combustion chamber.

The other objects and detailed affairs of the present invention will be clarified with following descriptions.

BRIEF DESCRIPTION OF THE DRAWING

FIG. 1 is a partial section view of the combustion chamber of an internal combustion engine of the torch ignition type taken along the line B—B in FIG. 2.

FIG. 2 is a partial section view taken along the line A—A in FIG. 1.

DETAILED DESCRIPTION

In FIG. 1 and FIG. 2, the cylinder head 1 of an internal combustion engine has a main combustion chamber 2 and a sub-combustion chamber 4 in connection with the main combustion chamber 2 through a connection hole 3, which is formed cylindrically and has smaller volume than the main combustion chamber 2.

A fuel injection nozzle 5 is settled on the cylinder head 1 to face to the sub-combustion chamber. And a connector 7 supporting an igniter 6 is settled on the cylinder head 1 to form partial portion of the sub-combustion chamber 4 with itself.

In the sub-combustion chamber 4, a combustion cylinder 8 is formed integrally with the connector 7 to form a circular space 9 between the combustion cylinder 8 and the inner surface of the sub-combustion chamber 4.

A hole 10 is cut through the side wall of the combustion cylinder 8 away from the ignition electrode of the igniter 6 with distance c in its axial direction. Thus, the inner space of the combustion cylinder 8 is in connection with the circular space of the sub-combustion chamber 4 through the hole 10.

The main combustion chamber 2 is in connection with an intake pipe 11 through an intake valve 12, while it is in connection with an exhaust pipe (not shown) through an exhaust valve 13. The intake valve 12 and the exhaust valve 13 are operated with a well known valve operation mechanism.

The connection hole 3 is tangential to the circumference of the sub-combustion chamber 4. The fuel injection nozzle 5 is settled to inject fuel toward outer surface of the combustion cylinder 8. And the hole 10 of the combustion cylinder 8 is angularly deviated from the ignition nozzle 5.

In operation, fuel injected into the sub-combustion chamber 4 with the injection nozzle 5 during compression stroke of the engine, is immediately vaporized by the combustion cylinder 8 which has already been heated with preceded combustion, and flows into the combustion cylinder 8 through the hole 10 to be ignited by the igniter 6. Thus, flare generated in the combustion cylinder 8 ignites mixed gas of high air-fuel ratio in the sub-combustion chamber 4 through the hole 10, and flare generated in the sub-combustion chamber 4 ignites mixed gas of low air-fuel ratio in the main combustion chamber 2 through the connection hole 3.

Mixed gas flowed into the sub-combustion chamber 4 from the main combustion chamber 2 during compression stroke of the engine is moderated with the combustion cylinder 8 before it enters the inner space of the combustion cylinder 8 through the hole 10 because the hole is positioned away from the ignition electrode of the igniter 6 not to face to the electrode, whereby flare generated at the electrode is never blown out by flow of mixed gas.

According to the present invention described above, wet or contamination of the igniter with injected fuel is prevented because fuel injected with the fuel injection nozzle enters the inner space of the combustion cylinder 8 after it is adequatly vaporized with the heated combustion cylinder 8.

What is claimed is:

1. A combustion chamber device for an internal combustion engine of the torch ignition type comprising at least one main combustion chamber connected to means for generating a rich fuel air mixture; a cylindrical sub-combustion chamber communicating with said main combustion chamber through a passageway which extends tangential to the circumference thereof, said passageway being connected to fuel supply means; and a cylindrical cup-shaped insert being positioned within said sub-combustion chamber defining an annular space with a side wall of said sub-combustion chamber, an igniter having an ignition electrode being positioned in said sub-combustion chamber, said insert surrounding the ignition electrode so as to prevent it from being directly moistened by enriched fuel which is supplied thereto, said insert having at least one small hole which extends through a side wall thereof in a direction away from said ignition electrode.

2. A combustion chamber device for an internal combustion engine of the torch ignition type as claimed in claim 1, said fuel supplying means comprising a fuel injection nozzle positioned out of alignment with said small hole in the side wall of said cylindrical cup-shaped insert.

* * * * *